(12) United States Patent
Lytle

(10) Patent No.: US 8,448,602 B2
(45) Date of Patent: May 28, 2013

(54) PET ACTUATED DRY FOOD FEEDER DEVICE

(76) Inventor: Anthony Lytle, Larwill, IN (US)

( * ) Notice: Subject to any disclaimer, the term of this patent is extended or adjusted under 35 U.S.C. 154(b) by 0 days.

(21) Appl. No.: 13/285,056

(22) Filed: Oct. 31, 2011

(65) Prior Publication Data

US 2012/0234248 A1    Sep. 20, 2012

Related U.S. Application Data

(60) Provisional application No. 61/453,334, filed on Mar. 16, 2011.

(51) Int. Cl.
*A01K 5/00* (2006.01)

(52) U.S. Cl.
USPC .................................................. 119/55

(58) Field of Classification Search
USPC .......................................... 119/53.5, 54, 55
See application file for complete search history.

(56) References Cited

U.S. PATENT DOCUMENTS

| | | | | |
|---|---|---|---|---|
| 1,054,463 A * | 2/1913 | Smith | | 119/62 |
| 1,449,485 A * | 3/1923 | Alspach | | 119/55 |
| 2,560,828 A * | 7/1951 | Spivey | | 119/55 |
| 2,699,755 A * | 1/1955 | Howell | | 119/55 |
| 2,791,201 A | 5/1957 | Jacob | | |
| 2,826,171 A | 3/1958 | Piel | | |
| 2,997,981 A * | 8/1961 | Siggins | | 119/55 |
| 4,479,456 A | 10/1984 | Schweiger | | |
| 4,572,108 A * | 2/1986 | Daifotes | | 119/51.01 |
| 4,770,125 A | 9/1988 | Gold | | |
| 5,184,569 A | 2/1993 | Collins | | |
| 5,463,979 A | 11/1995 | Fasino | | |
| 5,613,464 A * | 3/1997 | Petzel | | 119/55 |
| 5,794,561 A * | 8/1998 | Schulz | | 119/52.1 |
| 7,458,336 B2 * | 12/2008 | Eu | | 119/51.02 |
| 2001/0032594 A1 * | 10/2001 | Bickley | | 119/55 |
| 2007/0227461 A1 | 10/2007 | Chern | | |
| 2008/0060583 A1 * | 3/2008 | Liberto | | 119/54 |

* cited by examiner

*Primary Examiner* — Son T Nguyen
(74) *Attorney, Agent, or Firm* — Daniel Boudwin (57) ABSTRACT

A dry animal food feeder device that is adapted to provide a quantity of food based on input from a domestic animal. The device comprises a dry food hopper, which funnels downward to a smaller opening having a flapper-type trap door, operably connected to a series of linkages and a slide gate. A paw pedal is provided, which when depressed, operates the linkages to open the hopper trap door and release the slide gate, providing a quantity of food without dispensing the entire hopper upon depression of the pedal. The linkages are spring assisted to return to a first, closed state upon release of the paw pedal. The dispensing end of the device includes a chute or slide to flow food products therefrom and onto a ground surface for consumption. The entire assembly is housed in a waterproof container to prevent spoilage of the dry food products within the funnel.

7 Claims, 6 Drawing Sheets

PET ACTUATED DRY FOOD FEEDER DEVICE

CROSS REFERENCE TO RELATED APPLICATION

This application claims the benefit of U.S. Provisional Application 61/453,334 No. filed on Mar. 16, 2011, entitled "Doggie Diner."

BACKGROUND OF THE INVENTION

1. Field of the Invention

The present invention relates to dog feeder devices. More specifically, the present invention relates to a dog feeder with an enlarged food product hopper, a paw pedal actuator and linkages attached therebetween to dispense a quantity of dry food product from the hopper for each depression of the pedal. The device is adapted for dispensing quantities of dog feed based on a dog's input, independent of owner oversight.

2. Description of the Prior Art

Outdoor domestic pets require consistent vigilance with respect to feeding and cleaning, as these pets are generally left outdoors and in a defined area for extended periods of time. In particular, owners are required to provide a daily amount of food for the pet for sustenance and prevent the pet from becoming dehydrated or malnourished. Automatic and self-serving dog feeder devices are available on the market and are disclosed in the prior art. These devices lack the ability to store large quantities of dry pet food in a weatherproof container and dispense a small quantity thereof on-demand from the pet themselves, or are provided for use with livestock or commercial farms. The devices in the art further provide overly complex mechanisms and means for operating and dispensing food products based on input from a pet or via an automatic timer.

The present invention provides a dog food dispensing device that is operable by a dog or similar domestic pet via depression of a paw pedal, which in turn effectuates the delivery of a small quantity of food onto a ground surface opposite of the paw pedal for consumption. The device comprises an internal, reciprocating linkage that provides a means to dispense food from the hopper and return to a starting position. The hopper comprises a funnel-shaped device having a wide upper opening for loading dry, granular food product, and a tapering sidewall that ends in a smaller, food dispensing opening. Along the opening is a flapper-style trap door that is actuated by and connected to a series of linkages from the paw pedal. Attached to the trap door is a food diverter that rests within the funnel to ensure food products are directed in a desired direction and towards a food chute prior to exiting the structure. Above the diverter is provided a further diverter cover that allows gravity fed food to fall directly onto the diverter prior to being rotated by the trap door and dispensed onto the chute. An exterior slide gate is controlled and release by the linkages, which closes the trap door opening and provides a metering device. The slide gate ensures a metered quantity of food is dispensed onto the chute per depression of the paw pedal. Upon release of the pedal, a pair of springs pulls the linkages back into a starting position, closing the trap door and resetting the slide gate. The entire assembly is housed within a waterproof structure for storing a large quantity of pet food product in an outdoor environment, without risking spoiled or moistened food which would otherwise clog the hopper and prevent food dispensation.

Devices in the art provide animal-controlled feeders and reciprocating dispensers. These devices lack the elements of the present invention, and fail to provide a means to store large quantities of granular pet food in an outdoor environment and provide a robust means of dispensing food to an animal via their control.

U.S. Published Patent Publication Number 2007/0227461 to Chern is one such device that discloses a pet house having a lodging room and a food storage location. The food storage is accessible via a self-dispensing mechanism that provides a quantity of food and water to the pet for self-sufficiency thereof. The water dispenser is adapted for connection to a water hose, while the food dispensing means comprises a drive screw that moves dry food from a hopper to a dispensing location outside of the housing. The Chern device discloses an entire dog or pet house that incorporates living space and food and water dispensing means. While suited for its particular requirements, this device differs in structure and intent from the present invention. The mechanisms for dispensing food products are much more complicated, and rely on electrical power for operation. The present invention requires no power, as the actuation of the paw pedal drives a series of linkages that affect a dispensation of a defined quantity of food per depression.

U.S. Pat. No. 2,791,201 to Jacob, Sr. is another device that discloses a tablet form pet food feeder device that is adapted for self-service by a trained dog or similar domestic pet. The device comprises a fixed outer housing and an inner case that is adapted to slide upward or downward therein. Upon depression of a pedal device, the inner housing lifts upward and accepts a pet food tablet, which drops onto the pedal and falls out of the device for consumption by the pet. The Jacob, Sr. device is adapted for a particular type of pet food, wherein the food product is in a tablet form. The present invention is adapted to function with dry pet food of the granular or pellet form. The mechanisms and means for dispensing food from the Jacob, Sr. device substantially differs from the present invention, which incorporates a set of linkages and a large hopper of dry pet food within a weatherproof container.

U.S. Pat. No. 5,463,979 to Fasino describes a feed reservoir with a limb that limits an animal's access to the food. Pulling the obstructing limb rotates a rod that opens a feed gate, discharging feed to an underlying feed chamber. Access is then granted to the discharged feed, however upon release of the limb, the remaining food in the reservoir is blocked from animal access. The Fasino device describes a device adapted for bird feeders and wild animal feeders, as opposed to a domesticated pet feeder wherein access to an amount of food is granted on demand. The present invention provides a device that a dog or similar domestic animal may be trained to use, independent of owner oversight. A small quantity is provided upon depression of a paw pedal, which actuates a linkage to dispense a quantity of food from a larger hopper. The hopper is restricted by diverter and a slide gate, which limits the quantity of food distributed per depression of the paw pedal. The structure and intended uses of the present invention differ from the Fasino device.

U.S. Pat. No. 4,770,125 to Gold discloses a granular food dispensing machine. The machine comprises a faceplate, a discharge chute and a food supply reservoir mounting on a housing to create a gravity flow of food into the chute with a metering device to control the outflow of food from the reservoir. A spring-based, animal operated reciprocating actuator is engaged to the hopper through the faceplate to control the amount of food being discharged. While operable for dispensing metered quantities of a food product to a domestic animal, the Gold device substantially differs in design elements from the present invention. Its construction is not ideal for outdoor use, and its dispensing handle could be awkward for a dog to operate.

Finally, U.S. Pat. No. 4,479,456 to Schweiger describes an animal feeding apparatus in which the flow of feed and water is completely under control of the animal. The feed apparatus comprises a hopper and a feed dispensing means with a disposed slot in the hopper for dispensing portions of feed. An actuating means is operably connect to the dispensing means and adapted to be engaged by the head of an animal upon desire of a quantity of food product. The Schweiger device is adapted for use with both solid and liquid dispensing, and is operable by an animal and independent of human interaction. This apparatus is best used with farm animals, such as cows and hogs, as opposed to domestic animals such as dogs. The device provides a means to convey food products from a hopper and to a dispensing area; however its construction and design differ considerably from the present invention. The present invention is adapted for use around a residential home, and less for large scale commercial livestock applications.

The aforementioned prior art patents are considered pertinent to the disclosed invention. These devices fail to describe the mechanisms and construction of the present invention and have inherent drawbacks in their designs. The present invention substantially diverges in design elements from the prior art, and consequently it is clear that there is a need in the art for an improvement to existing pet-controlled feeder devices. In this regard the instant invention substantially fulfills these needs.

SUMMARY OF THE INVENTION

In view of the foregoing disadvantages inherent in the known types of pet-controlled feeder devices now present in the prior art, the present invention provides a new feeder device wherein the same can be utilized for providing convenience for the user when providing a means for a trained pet to dispense a metered quantity of granular food product upon depression of a paw pedal.

It is therefore an object of the present invention to provide a new and improved pet-controlled feeder device that has all of the advantages of the prior art and none of the disadvantages.

Another object of the present invention to provide a device that is operable by a trained pet, such as a dog or similar domesticated animal, to deliver a metered quantity of granular food product upon depression of a pedal, wherein only a defined quantity of food is provided and is provided on-demand by the pet.

Another object of the present invention is to provide a purely mechanical mechanism for dispensing food from a large hopper upon request by a pet, wherein no electrical means are required.

Another object of the present invention is to provide a robust means of storing and dispensing granular pet food, wherein a funnel of food is housed within a weatherproof container that prevents spoilage, contamination or pest access.

Yet another object of the present invention is to provide a linkage with a return means, wherein the paw pedal is returned to an original state after depression and release thereof by the requesting pet.

A final object of the present invention is to provide food dispensing device that is adapted to be easily adopted by a domestic animal, wherein time required for training is reduced due to its simple construction and method of operation.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Reference is made herein to the attached drawings. Like reference numerals are used throughout the drawings to depict like or similar elements of the pet-controlled food dispensing device. For the purposes of presenting a brief and clear description of the present invention, the preferred embodiment will be discussed as used for providing a means to allow a pet or domestic animal request and dispense food from a hopper filled with a quantity of feed. The figures are intended for representative purposes only and should not be considered to be limiting in any respect.

Figure 1:
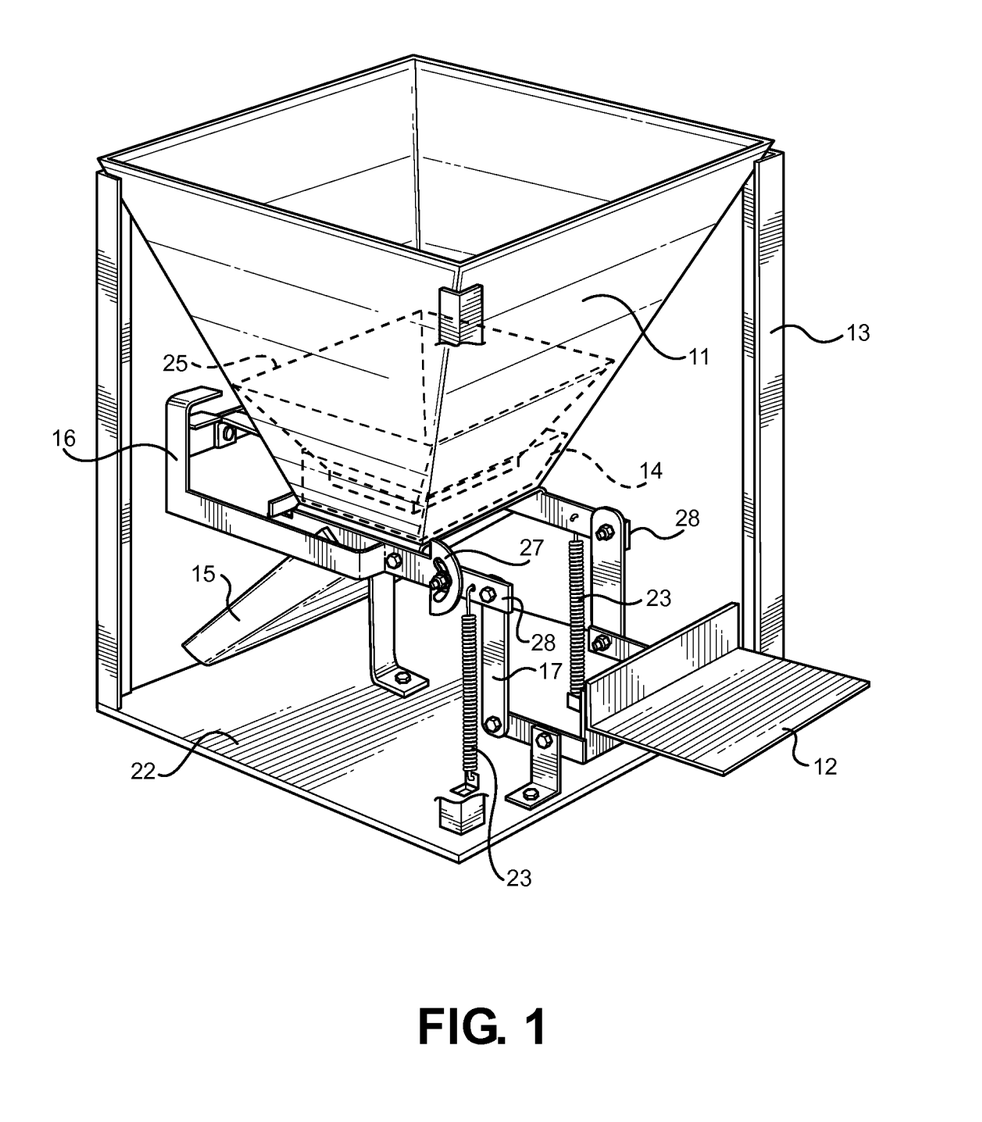
FIG. 1 shows an overhead perspective view of the present invention without its outer housing, wherein the internal structure of the device is shown.

Referring now to FIG. 1, there is shown an overhead perspective view of the pet-controlled food dispensing device of the present invention, wherein its outer housing is removed. The internal structure of the device is shown, wherein a plurality of linkages are positioned beneath a large, granular food containing hopper 11. The hopper 11 is a tapered funnel adapted to retain a large quantity of pellet-form or similar dry pet food product therein. The hopper comprises a large upper opening and a smaller, dispensing opening along its lower region. Food products rest within the hopper and are gravity fed onto an angled chute 15 provided along one side of the device. Along the lower opening of the funnel is disposed a flapper-style trap door, which comprises a square door that is hinged along a first edge that is shared edge with the funnel lower opening. Within the funnel and attached to the trap door is a diverter 14, which directs the flow of food from the hopper 11 and onto the chute 15 for dispensation onto a ground surface. The trap door includes three upstanding diverter walls extending from the perimeter of the trap door, and an open top. This permits the bottom portion of a shroud 25 to extend down into an area between the upstanding walls when the trap door is in a closed position. The diverter 14 is attached to the flapper and rotates from a closed position into an open position, wherein the open position prevents food from exiting the hopper 11 along the sides of the trap door 15. In this way, the direction of food flow is controlled as it leaves the hopper 11. Above the diverter 14 is a further shroud 25 that ensures the food is fed directly onto the diverter 14, further necking the hopper lower opening. The goal of both the diverter 14 and the shroud 25 are to prevent food from exiting the hopper in any direction other than the chute 15 direction.

The device is contained within a protective housing (not shown in FIG. 1) to prevent spoilage or unwanted access to the food within the hopper, and to further prevent a pet from entangling within the mechanisms that operate the device. A paw pedal 12 protrudes from a first side of the housing, which has a vertical range of motion to allow a pet to depress the pedal and affect a dispensation of food product from an opposite side of the housing via the chute 15. Apertures in the housing are provided only for the chute 15 and the range of motion of the linkages attached to the paw pedal 12, thereby eliminating the risk of pests and other vermin infiltrating the housing and gaining access to the food within the hopper. A lid is disposed above the house, whereby the lid may be removed to provide access for a user to refill food product into the hopper 11. The hopper 11 itself is support by four upstanding supports 13 that similarly provide a frame for the housing walls to attach. The supports extend from a base 22 shelf to the upper most region of the hopper 11, whereby a lid provides closure over the hopper opening and a lip that extends over the exterior of the housing walls.

The mechanisms for operating the device are primarily located within a cavity below the hopper 11 and within the housing. This prevents any pinching or entanglement concern, and further prevents the linkages from exposure to water or other environmental elements. The paw pedal 12 attaches to a pair of vertical linkage arms 17, wherein the two are attached to a pivot point that allows the linkage arms 17 to raise as the pedal 12 is depressed (lowered). The linkage arms attach to a pair of extensions 28 formed from the trap door, which attach to a pivot point along the edge of the hopper opening to allow the upward moving link 17 to rotate the trap door into an open position. A horizontal side link 16 attaches directly to the trap door extensions 28 at the trap door hinge point, while a cam adjuster 27 allows the horizontal side link 16 to be adjustably positioned with respect to the hinge point. The side link 16 extends to the opposite side of the hopper to actuate the slide door release mechanism. The side link 16 is be comprised of a singular member wherein its starting position is adjustable via the cam adjuster to modify the amount of pedal 12 depression required release the slide gate. The trap door begins the process of moving food from the hopper to the chute, while the slide gate closes the opening of the trap door soon thereafter, preventing an overflow of food from exiting and only a metered amount to be dispensed. The position of the side link 16 and its adjustability will determine the degree of pedal 12 depression and also the action of the slide gate release, which ultimately controls the amount of food exiting the hopper prior to the slide gate closing. The trap door extensions 28 are attached to the base 22 by a pair of springs 23, which provide a resistive force against the depression of the pedal 12 and a means to return the pedal to its original position prior to being depressed. Therefore, the linkages provide a means to dispense a metered quantity of food and return to an original state, wherein further depressions may repeat the process. The relative angle of the side link, and any adjustment thereof controls the variables in dispensation and amount of vertical travel required by the pedal 12 to release the slide gate and close off the opening created by the open trap door.

Figure 2:
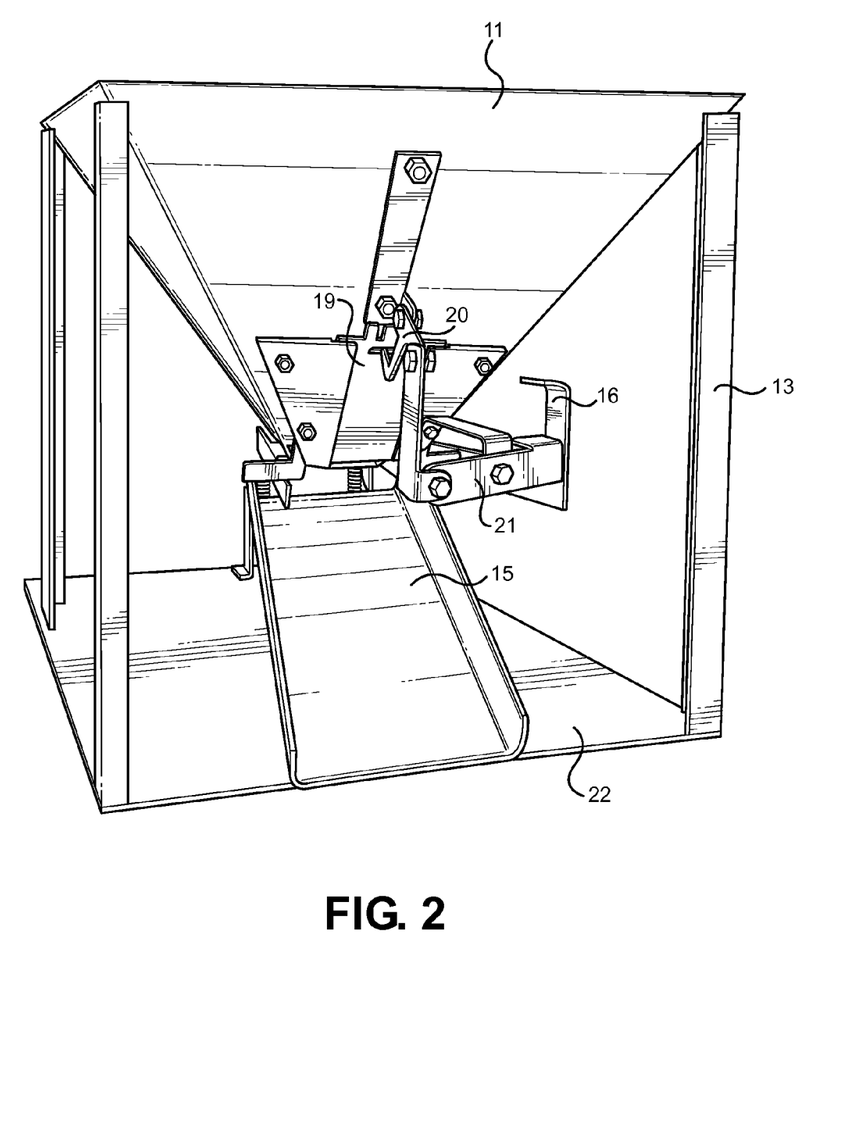
FIG. 2 shows a rear perspective view of the present invention, similarly without its outer housing.

Referring now to FIG. 2, there is shown a rear perspective view of the present invention, wherein the housing walls and lid are removed to show the backside of the device. Food product from the hopper 11 is dispensed onto the chute 15, which allows food to slide onto a ground surface along this side of the device. The slide gate 19 and its associated control mechanisms are shown in better detail, which are operably controlled by the side link 16 connected to the paw pedal along the front side of the device. Upon depression of the paw pedal, the side link 16 is rotated about a pivot point shared by the hinge of the hopper trap door. This rotation causes the distal end of the side link 16 to contact a rocker arm 21 that connects to a further linkage and controls the slide gate catch mechanism 20. The catch mechanism 20 is a catch that slides into a slot along the slide gate 19 and holds it in position when the paw pedal is in its original position. Once the pedal is depressed, the side link 16 rotates the hopper trap door, allowing food to exit the hopper. If left unchecked, the food would continue to rush therefrom and empty the hopper. To prevent this, the side link 16 actuates the slide gate control mechanisms to release the slide gate catch 20 from its slotted position. This allows the slide gate 19 to slide downwards along the exterior of the hopper and close off the flow of food from the hopper and diverter therein. In this way, the food dispensation is regulated, or metered, preventing the pet from depressing the pedal a single time and completely emptying the hopper 11. Once the paw pedal is released, the springs return the side link 16 to its original position, rotating the hopper trap door back into its original state. Flanges on the slide gate 19 bear against the trap door as it is rotated back into position. The flanges lift the slide gate back into its original position, while the catch mechanism 20 secures it its original position. The release of the catch 20 and the rotation of the trap door are offset slightly to allow a quantity of food to pass through the opening created by their separation. The window of time allowed for this opening determines the amount of food dispensed. The size of food pellets determines whether the slide gate 19 must completely close off the opening created by the trap door in order to effectively clog the flow of food from the hopper to the chute, as larger pellets of food allow the slide gate to stop the flow without fully closing the opening and prevent flow therethrough, as opposed to more granular food products wherein the slide gate must close more completely to shut off flow.

Figure 3:
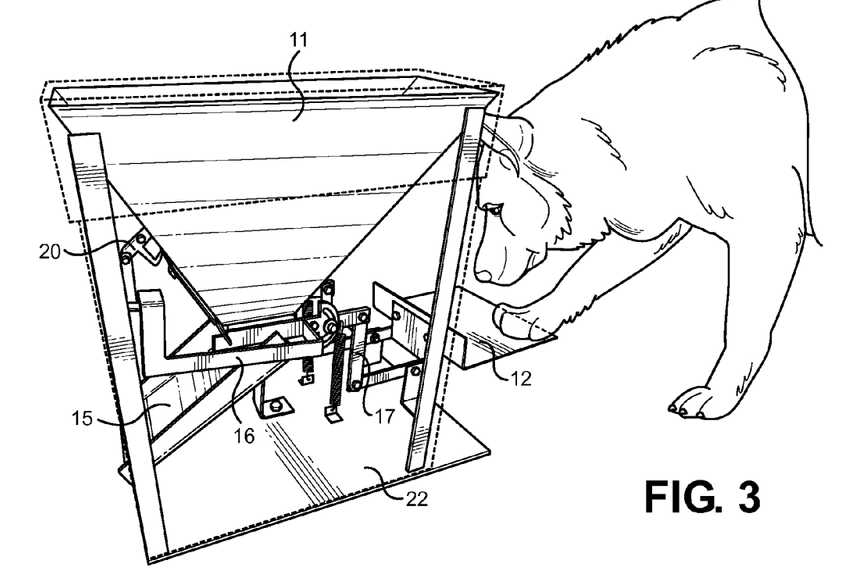
FIG. 3 shows a side perspective view of the present invention being utilized by a pet.

Referring now to FIG. 3, there is shown a side perspective view of the present invention, wherein a dog is depressing the paw pedal 12 to dispense a quantity of food product from the front side of the housing. The housing is shown in hidden lines to illustrate the internal structure and mechanisms that operate the device. As noted, depression of the pedal 12 rotates a the trap door and side link 16, which allows food to flow from the trap door of the hopper 11 and then releases the slide gate catch mechanism 20. A small quantity of food is therefore dispensed onto the chute 15 and onto a ground opposite of the paw pedal 12 per depression of the pedal.

The overall device operates as a gravity feed device, wherein the hopper 11 acts as a tapered funnel. The base of the funnel is controlled by a flapper trap door, which rotates from a closed position to an open position. Food is sent through the opened trap door and directed by an attached diverter. The diverter comprises three upstanding sidewalls and an open side. The sidewalls prevent food from exiting the hopper as it would otherwise: in the path of least resistance. The flow of food is effectively controlled and diverted directly onto the chute 15, wherein its sidewalls prevent food from exiting the side of the trap door. Food slides down the chute 15 and out of the housing for consumption by the pet. The diverter is connected to and rotates with the trap door during its operation, therefore an internal shroud is necessary to further neck the funnel and allow food to only flow onto the diverter and within its three upstanding sidewalls, and thus preventing food from falling behind the diverter once rotated.

Figure 4:
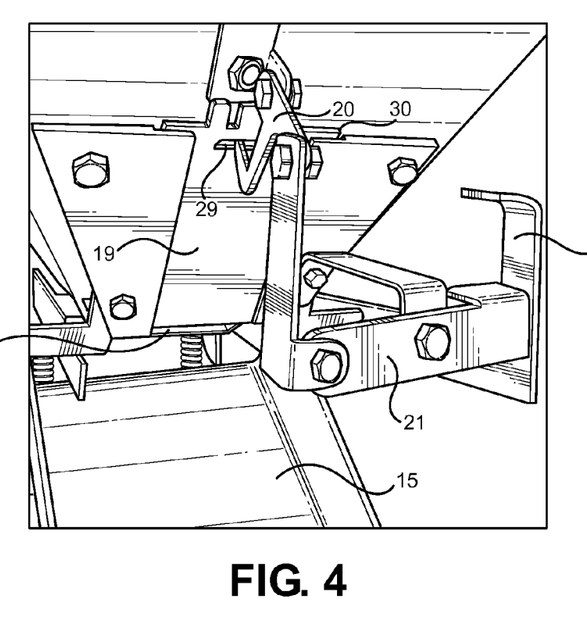
FIG. 4 shows a rear close-up view of the device wherein the linkages controlling the slide gate are shown prior to depression of the paw pedal.
Figure 5:
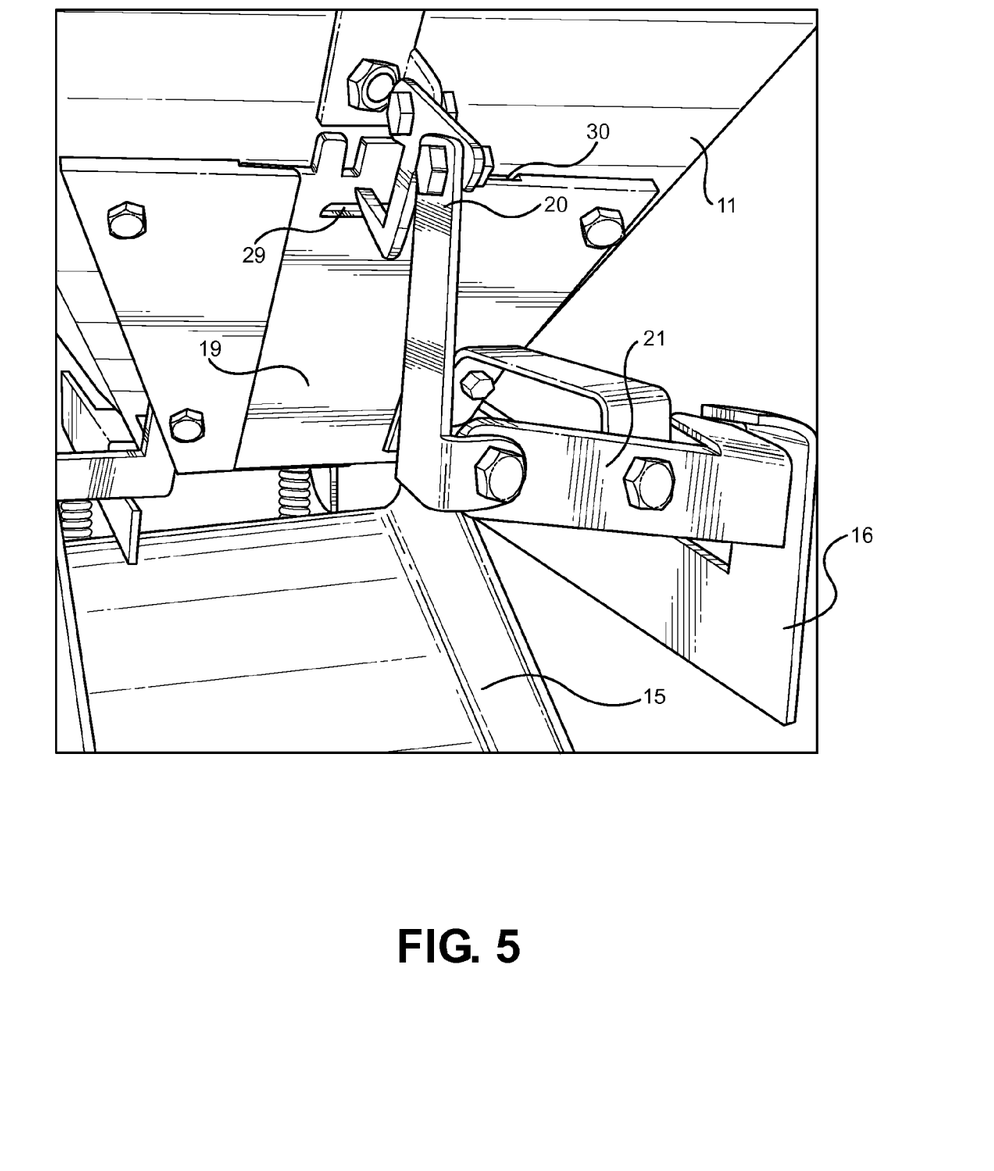
FIG. 5 shows a second rear close-up view of the device wherein the linkages controlling the slide gate are shown after depression of the paw pedal and upon release of the slide gate.

Referring now to FIG. 4 and FIG. 5, there is shown closer view of the slide gate mechanism in a first closed and second open position. As previously mentioned, the slide gate 19 meters the dispensation of food from the hopper/diverter upon depression of the paw pedal. A slide gate catch 20 attaches to the slide gate 19 in a groove 29 formed therein, which holds the slide gate 19 in an open position until depression of the pedal forces the side link 16 to contact a rocker arm 21 that lifts the catch from a slot provided in the slide gate 19, allowing the slide gate to slide along the side of the hopper and close off the opening created by the rotated trap door 24. The slide gate travels along a slide gate tabbed slot 30 created along the exterior of the hopper 11, which allows up-down travel of the slide gate along the hopper exterior via gravity. When the pedal is released, the trap door 24 is returned to a closed position. The trap door 24 raises the slide gate 19 via a pair of tabs. Once returned to its original state, the catch 20 is replaced into the slide gate tabbed slot 30, and is removed from the groove 29, which prevents its movement until a subsequent depression of the pedal disengages it.

Figure 6:
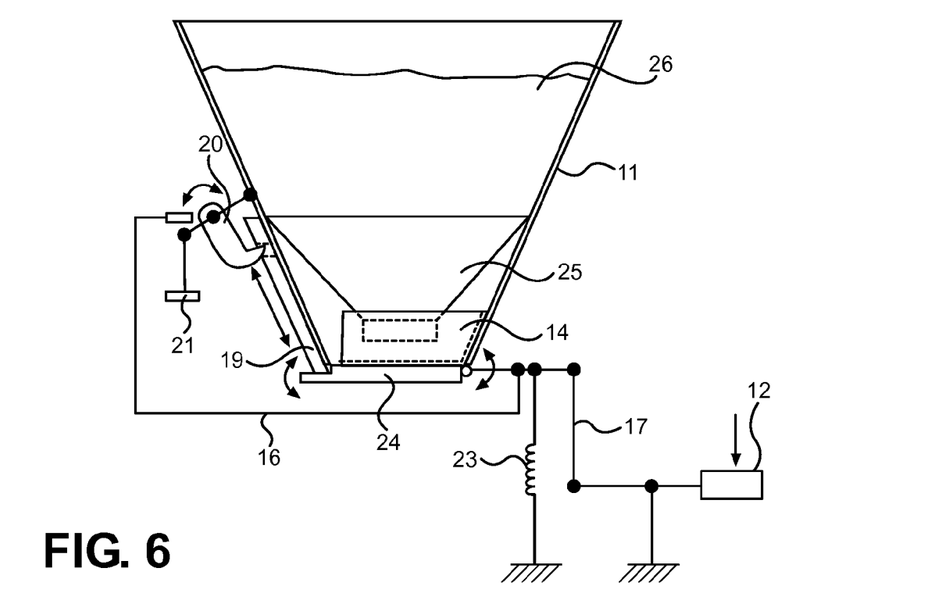
FIG. 6 shows a simplified view of the operation of the device linkages, wherein the initial state is shown.
Figure 7:
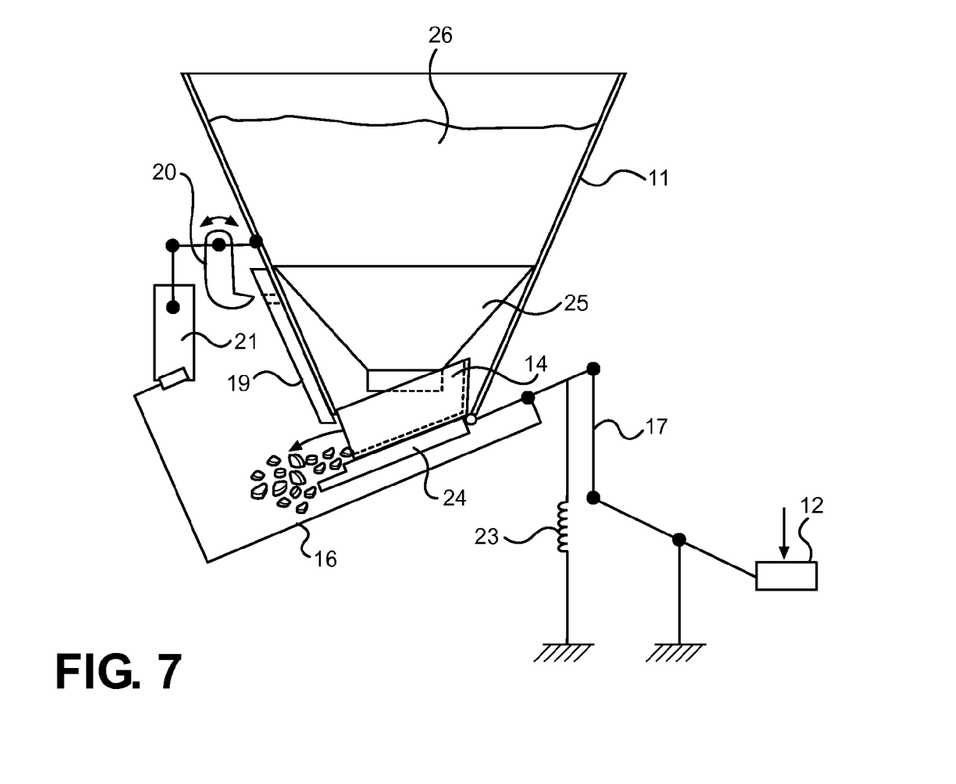
FIG. 7 shows a simplified view of the operation of the device linkages, wherein the paw pedal is being depressed.
Figure 8:
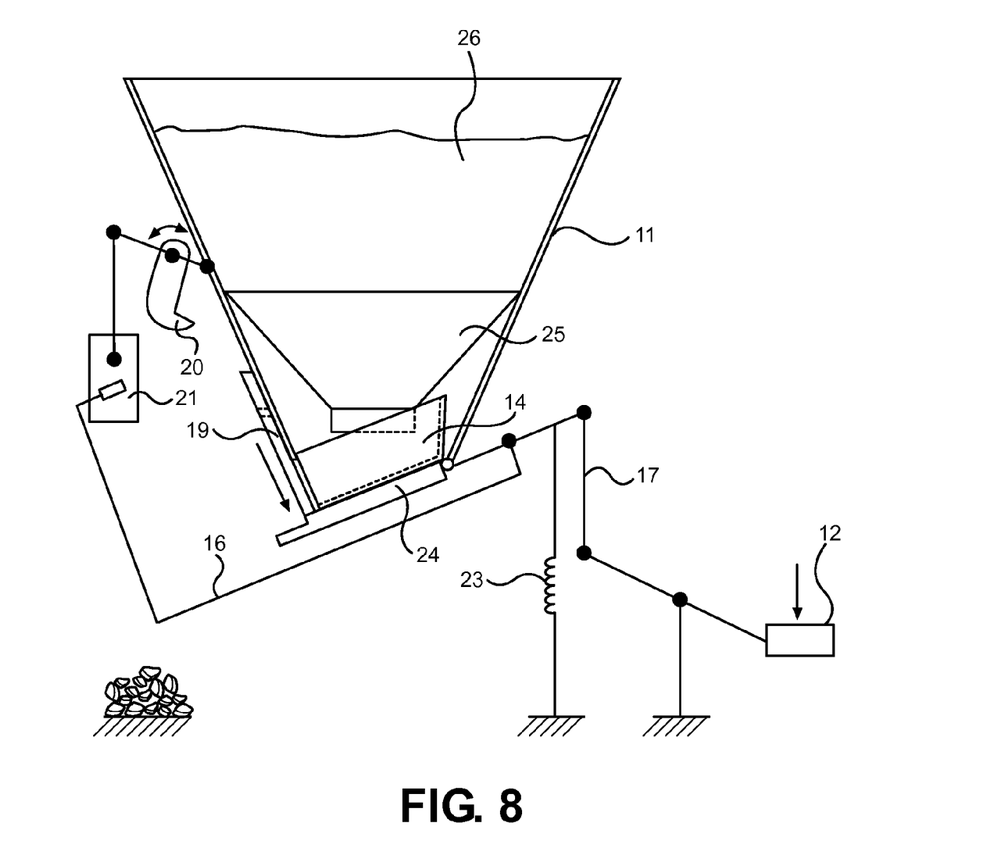
FIG. 8 shows a simplified view of the operation of the device linkages, wherein the paw pedal has been depressed and the slide gate has closed the hopper chute.

Referring now to FIG. 6 through FIG. 8, there are shown simplified, pictorial views of the action of the linkages and a planform view of the hopper internal members. The pedal 12 is depressed by a pet requesting a quantity of food 26. The depression of the pedal pivots a linkage arm 17 that connects to the trap door extensions and side link 16 on one side of hopper. The side link 16 shares a pivot location with the trap door 24 of the hopper, which is rotated into an open position to allow food to exit from the hopper chute, onto the diverter 14 and through the lower opening of the hopper 11. The side link 16 further actuates the slide gate catch 20 via a rocker arm 21, which releases the slide gate 19. The slide gate 19 then closes the opening of the hopper and discontinues the flow of food therethrough until the pedal 12 is returned and depressed again. A spring 23 attaches to the side link 16 and returns the linkages to their original state upon release of the pedal 12.

In use the device functions as a standalone means for providing food to a trained pet upon its request and without user vigilance. The pet is trained to depress the pedal for a quantity of food, and therefore learns that this device is the means for dispensing food when hungry. The device comprises a series of internal linkages and mechanical mechanisms that are contained within a protective housing. The housing attaches to support posts that hold the hopper in place, while a lid prevents access to the contents of the hopper from above. The linkages and means for dispensing the food show and described in the figures constitute a particular embodiment that has been shown to operate for the intended function. The exact mechanisms for achieving this goal are not desired to be limited, but rather it is desired to show a working embodiment. The present invention comprises a main hopper for storing food, which tapers downward to an opening to gravity feed granular food material. The opening is controlled by a diverter and hopper chute to control the direction of food flow from the hopper. A trap door and slide gate control the dispensation of food from the hopper, which is gravity fed through a hole between the gate and trap door onto an angled chute. The chute directs food out of the housing for consumption. The motion of the slide gate and trap door is controlled by a pedal device, which is spring loaded to return to an original state and is actuated by the pet itself. The device is capable for operating outdoors and in extreme conditions for extended periods, requiring only a refresh of the hopper contents over time as they are depleted.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A pet-operated food dispensing device, comprising:
   a hopper having an open top, tapering sidewalls and a lower opening for holding a quantity of granular food products;
   a trap door hingedly attached to said hopper lower opening and having an open and closed position;
   a slide gate having a rocker arm, a slide gate catch mechanism and a slide gate tabbed slot, said slide gate slideably attached to said hopper for closing said trap door when said trap door is in an open position, metering flow of food from said hopper;
   an angled chute for accepting and directing food from said open trap door;
   a depressible paw pedal;
   said paw pedal connecting to a plurality of linkages to open said trap door and operate said slide gate;
   said linkages further comprising a spring return mechanism for returning said pedal, trap door and slide gate to an original, closed position.

2. The device of claim 1, wherein said trap door further comprises three upstanding diverter walls extending from the perimeter of an upper surface of said trap door, and an open top to permit a bottom portion of a funnel shroud within said hopper to extend down into an area between said upstanding walls when said trap door is in a closed position, wherein said diverter walls directs-the flow of food from said hopper to said chute and directs food to flow in a single direction.

3. The device of claim 2, wherein said food is directed onto said trap door upper surface by said funnel shroud that further necks said hopper lower opening and directs food products directly onto said diverter.

4. The device of claim 1, further comprising a housing having a base, upstanding supports, sidewalls and a lid to prevent access to said hopper or entanglement with said linkages; said sidewalls having apertures for said chute and a pedal linkage connection.

5. The device of claim 1, wherein said linkages comprise:
   a pair of linkage arms pivotably connected to said pedal;

said linkage arms rotating trap door extensions to rotate said trap door;

a side link adjustably connected to said trap door extension;

said side link sharing a common pivot point as said trap door and having a cam adjuster to update its position in relation to said trap door;

said side link further actuating a slide gate mechanism for controlling said slide gate position;

said spring return mechanism comprising a pair of springs attached to said side link to resist said pedal depression and rotate said side link into its original position.

6. The device of claim 5, wherein said side link adapted to rotate said rocker arm and remove said slide gate catch from a groove in said slide gate;

said slide gate slideably positioned within said tabbed slot, attached to said hopper exterior;

said trap door adapted to return said slide gate into its original position upon release of said pedal and return of said trap door to its closed state.

7. A pet-operated food dispensing device, comprising:

a hopper having an open top, tapering sidewalls and a lower opening for holding a quantity of granular food products;

a trap door hingedly attached to said hopper lower opening and having an open and closed position;

a slide gate slideably attached to said hopper for closing said trap door when said trap door is in an open position, metering flow of food from said hopper;

an angled chute for accepting and directing food from said open trap door;

a depressible paw pedal;

said paw pedal connecting to a plurality of linkages to open said trap door and operate said slide gate;

said linkages further comprising a pair of linkage arms pivotably connected to said pedal;

said linkage arms rotating trap door extensions to rotate said trap door;

a side link adjustably connected to said trap door extension;

said side link sharing a common pivot point as said trap door and having a cam adjuster to update its position in relation to said trap door;

said side link further actuating a slide gate mechanism for controlling said slide gate position;

a spring return mechanism comprising a pair of springs attached to said side link to resist said pedal depression and rotate said side link into its original position.

* * * * *